is001683681B2

United States Patent
Liu et al.

(10) Patent No.: US 11,683,681 B2
(45) Date of Patent: Jun. 20, 2023

(54) UPLINK SMALL DATA TRANSMISSION IN INACTIVE STATE

(71) Applicant: QUALCOMM Incorporated, San Diego, CA (US)

(72) Inventors: Huichun Liu, San Diego, CA (US); Miguel Griot, La Jolla, CA (US); Gavin Bernard Horn, La Jolla, CA (US); Keiichi Kubota, Setagaya-ku (JP); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 16/607,299

(22) PCT Filed: May 23, 2018

(86) PCT No.: PCT/CN2018/087987
§ 371 (c)(1),
(2) Date: Oct. 22, 2019

(87) PCT Pub. No.: WO2018/214903
PCT Pub. Date: Nov. 29, 2018

(65) Prior Publication Data
US 2020/0137564 A1    Apr. 30, 2020

(30) Foreign Application Priority Data
May 24, 2017    (WO) ............... PCT/CN2017/085701

(51) Int. Cl.
*H04L 29/06*    (2006.01)
*H04W 12/037*    (2021.01)
(Continued)

(52) U.S. Cl.
CPC ......... *H04W 12/037* (2021.01); *H04L 9/0866* (2013.01); *H04W 12/041* (2021.01);
(Continued)

(58) Field of Classification Search
CPC .. H04L 9/0866; H04L 2209/80; H04W 12/08; H04W 36/0038; H04W 36/08
See application file for complete search history.

(56) References Cited

U.S. PATENT DOCUMENTS 9,232,390 B2 *    1/2016    Blom .................... H04L 9/0656
10,009,926 B2    6/2018    Vajapeyam et al.
(Continued)

FOREIGN PATENT DOCUMENTS

CN        1522517 A       8/2004
CN      102469454 A       5/2012
(Continued)

OTHER PUBLICATIONS

Schlienz, J., and A. Roessler. "Device to device communication in lte whitepaper." ROHDE & SCHWARZ: Munich, Germany (2015). (Year: 2015).*
(Continued)

*Primary Examiner* — Shawnchoy Rahman

(57) ABSTRACT

Certain aspects of the present disclosure relate to methods and apparatus for optimizing delivery of a data to and/or from a UE in a connected but inactive state.

28 Claims, 19 Drawing Sheets

(51) Int. Cl.
    *H04L 9/08*         (2006.01)
    *H04W 12/08*       (2021.01)
    *H04W 36/00*       (2009.01)
    *H04W 36/08*       (2009.01)
    *H04W 12/041*     (2021.01)

(52) U.S. Cl.
    CPC ....... *H04W 12/08* (2013.01); *H04W 36/0038* (2013.01); *H04W 36/08* (2013.01); *H04L 2209/80* (2013.01)

(56) References Cited

U.S. PATENT DOCUMENTS

| | | | |
|---|---|---|---|
| 2009/0041246 A1 | 2/2009 | Kitazoe | |
| 2013/0114813 A1 | 5/2013 | Chai | |
| 2013/0260811 A1 | 10/2013 | Rayavarapu | |
| 2013/0301611 A1 | 11/2013 | Baghel et al. | |

FOREIGN PATENT DOCUMENTS

| | | | | |
|---|---|---|---|---|
| CN | 103430478 A | 12/2013 | | |
| CN | 103581899 A | 2/2014 | | |
| CN | 104272671 A | 1/2015 | | |
| CN | 106068670 A | 11/2016 | | |
| EP | 1359778 A1 | 11/2003 | | |
| TW | 201412154 A | 3/2014 | | |
| WO | WO-2010057123 A2 | * | 5/2010 | ............ H04W 24/10 |
| WO | WO-2012019362 A1 | * | 2/2012 | ............ H04W 36/24 |
| WO | WO-2016007257 A1 | | 1/2016 | |
| WO | 2016049125 A1 | | 3/2016 | |
| WO | WO-2016205991 A1 | * | 12/2016 | ......... H04L 63/0428 |
| WO | WO-2017048170 A1 | | 3/2017 | |
| WO | WO-2019214052 A1 | | 11/2019 | |

OTHER PUBLICATIONS

Ericsson: "Security Solution for Infrequent Small Data" [online], 3GPP Draft, S3-161869 was S3-161408, 3GPP TSG-SA3 Meeting #85, Small Data, 3rd Generation Partnership Project (3GPP), Mobile Competence Centre, 650, Route Des Lucioles, F-06921 Sophia-Antipolis Cedex, France, vol. RAN WG3, No. Santa Cruz de Tenerife, Spain, Nov. 7-Nov. 11, 2016, Nov. 6, 2016 (Nov. 6, 2016), XP051185932, 8 Pages, Retrieved from the Internet: URL: http://www.3gpp.org/ftp/Meetings_3GPP_SYNC/SA3/Docs/ [retrieved on Nov. 6, 2016] pp. 5-6, paragraph 5.14.X.2.3.

Ericsson: "Security for RRC Connection Suspend and Resume Procedure in Solution 18 for Narrow Band CIoT," 3GPP Draft, 3GPP TSG-SA WG3 Meeting #82, S3-160157_NBCIOT_DISCUSSION PAPER_RRC Connection Suspend and Resume, 3rd Generation Partnership Project (3GPP), Mobile Competence Centre, 650, Route Des Lucioles, F-06921, Sophia-Antipolis Cedex, France, vol. SA WG3 No. Dubrovnik, Croatia, Feb. 1-Feb. 5, 2016, Jan. 31, 2016 (Jan. 31, 2016), XP051060426, 7 pages, Retrieved from the Internet: URL: http://www.3gpp.org/ftp/Meetings_3GPP_SYNC/SA3/Docs/ [retrieved on Jan. 31, 2016], the whole document.

Ericsson: "RAN Area Updating Due to Mobility in RRC_INACTIVE" [online], 3GPP Draft, 3GPP TSG-RAN WG2 #98, Tdoc R2-1704120, Hangzhou, P.R. of China, May 15-19, 2017, 7 Pages, Retrieved from the Internet URL: Internet URL: http://www.3gpp.org/ftp/tsg_ran/WG2_RL2/TSGR2_98/Docs/R2-1704120.zip.

Nokia, et al., "Security Handling During State Transition from RRC_INACTIVE to RRC_CONNECTED" [online], 3GPP Draft, 3GPP TSG-RAN WG2 Meeting #98, R2-1704292, Hangzhou, China, May 15-19, 2017, 4 Pages, Retrieved from the Internet URL: http://www.3gpp.org/ftp/tsg_ran/WG2_RL2/TSGR2_98/Docs/R2-1704292.zip.

Qualcomm Incorporated: "Correct That in NB-IoT pdcp Linked to Support of S1-U Data Transfer," 3GPP Draft, 3GPP TSG-RAN WG2 Meeting #97, 36300_CR0962_ (REL-13)_R2-1701138—Correct Support for PDCP Linked TO S1-U Data Transfer, 3rd Generation Partnership Project (3GPP), Mobile Competence Centre, 650, Route Des Lucioles, F-06921, Sophia-Antipolis Cedex, France, vol. RAN WG2. No. Athens. Greece, Feb. 13-Feb. 17, 2017, Feb. 3, 2017 (Feb. 3, 2017), XP051222640, 13 pages, Retrieved from the Internet: URL: http://www.3gpp.org/ftp/tsg_ran/WG2_RL2/TSGR2_97/Docs/ [retrieved on Feb. 3, 2017], p. 11.

Samsung: "Security Procedure from RRC_INACTIVE State in NR" [online], 3GPP Draft, 3GPP TSG-RAN WG2 NR Ad hoc meeting, R2-1706806, Qingdao, China, Jun. 27-29, 2017, 6 Pages, Retrieved from the Internet URL: http://www.3gpp.org/ftp/tsg_ran/WG2_RL2/TSGR2_AHs/2017_06_NR/Docs/R2-1706806.zip.

Supplementary European Search Report—EP18804967—Search Authority—Munich—Jan. 25, 2021.

Taiwan Search Report—TW107117704—TIPO—Aug. 4, 2021.

International Search Report and Written Opinion—PCT/CN2017/085701—ISA/EPO—Feb. 7, 2018.

International Search Report and Written Opinion—PCT/CN2018/087987—ISA/EPO—Aug. 31, 2018.

Qualcomm Incorporated: "NAS Security Contexts for NI S3-170841", 3GPP TSG SA WG3 Meeting #86Bis, Mar. 20, 2017, 2 pages.

* cited by examiner

| Scenario 1 | Scenario 2 | Scenario 3 |
|---|---|---|
| same cell (as it was previously connected). | same PDCP entity (e.g. PDCP entity does not need to be relocated) | different cell and the cell is "covered" by a different PDCP entity (e.g. PDCP relocation is required) |

FIG. 8

UPLINK SMALL DATA TRANSMISSION IN INACTIVE STATE

CROSS-REFERENCE TO RELATED APPLICATION & PRIORITY CLAIM

This application is a national stage application under 35 U.S.C. 371 of PCT/CN2018/087987, filed May 23, 2018, which claims the benefit and priority to Patent Cooperation Treaty Application No. PCT/CN2017/085701, filed May 24, 2017, which are both hereby assigned to the assignee hereof and hereby expressly incorporated by reference herein as if fully set forth below and for all applicable purposes.

FIELD

The present disclosure relates generally to communication systems, and more particularly, to methods and apparatus for optimizing delivery of data from a user equipment (UE) in an inactive network state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for optimizing delivery of data to and/or from a user equipment in an inactive network state.

Aspects of the present disclosure provide a method for wireless communications by a user equipment (UE). The method generally includes generating, while in a state with no dedicated resources allocated to the UE, a message with a first UE identification encrypted using a first key and uplink data encrypted using a second key derived based on information obtained from a first base station in a first cell prior to transitioning to the state and transmitting the message to a second base station in a second cell.

Aspects of the present disclosure provide a method for wireless communications by a serving base station. The method generally includes receiving, from a user equipment that is in a state with no dedicated resources allocated to the UE, a message with a first UE identification encrypted using a first key and uplink data encrypted using a second key derived by the UE based on information obtained from another base station in a first cell prior to the UE transitioning to the state, sending a request to the other base station to transfer a context of the UE to the serving base station, receiving a response to the request, the response including information regarding the second key, and decrypting the uplink data using the second key.

Aspects of the present disclosure provide a method for wireless communications by an anchor base station. The method generally includes providing, to a user equipment configured with a first key used to encrypt uplink data to be sent to another base station while the UE is in a state with no dedicated resources allocated to the UE, information for deriving a second key, receiving a request from the other base station to transfer a context of the UE from the anchor base station to the other base station, and transmitting a response to the request, the response including information regarding the second key.

Aspects of the present disclosure provide a method for wireless communications by a user equipment (UE). The method generally includes deriving a first key while in a first state with dedicated resources allocated to the UE, generating, while in a second state with no dedicated resources allocated to the UE, a first message with a first UE identification and uplink data encrypted using the first key, transmitting the message to a second base station in a second cell, deriving a second key, based on information obtained from the second base station, generating, while in a second state with no dedicated resources allocated to the UE, a second message with uplink data encrypted using the second key, and transmitting the message to the second base station in the second cell.

Aspects of the present disclosure provide a method for wireless communications by a serving base station. The method generally includes receiving, from a user equipment that is in a state with no dedicated resources allocated to the UE, a first message with a first UE identification and uplink data encrypted using a first key, forwarding the message to another base station, participating in a path switch from the other base station to the serving base station, configuring the UE with a second UE identification and information for deriving a second key, and receiving, from the UE, a second message with the second UE identification and uplink data encrypted using the second key.

Aspects of the present disclosure provide a method for wireless communications by an anchor base station. The method generally includes placing a user equipment (UE) in a state with no dedicated resources allocated to the UE, the UE configured with a first key, receiving, from a serving base station, a first message with a first UE identification and uplink data encrypted by the UE using the first key, and deciding whether to transfer context of the UE to the serving base station.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates different types of scenarios for uplink data transmissions that may be handled in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
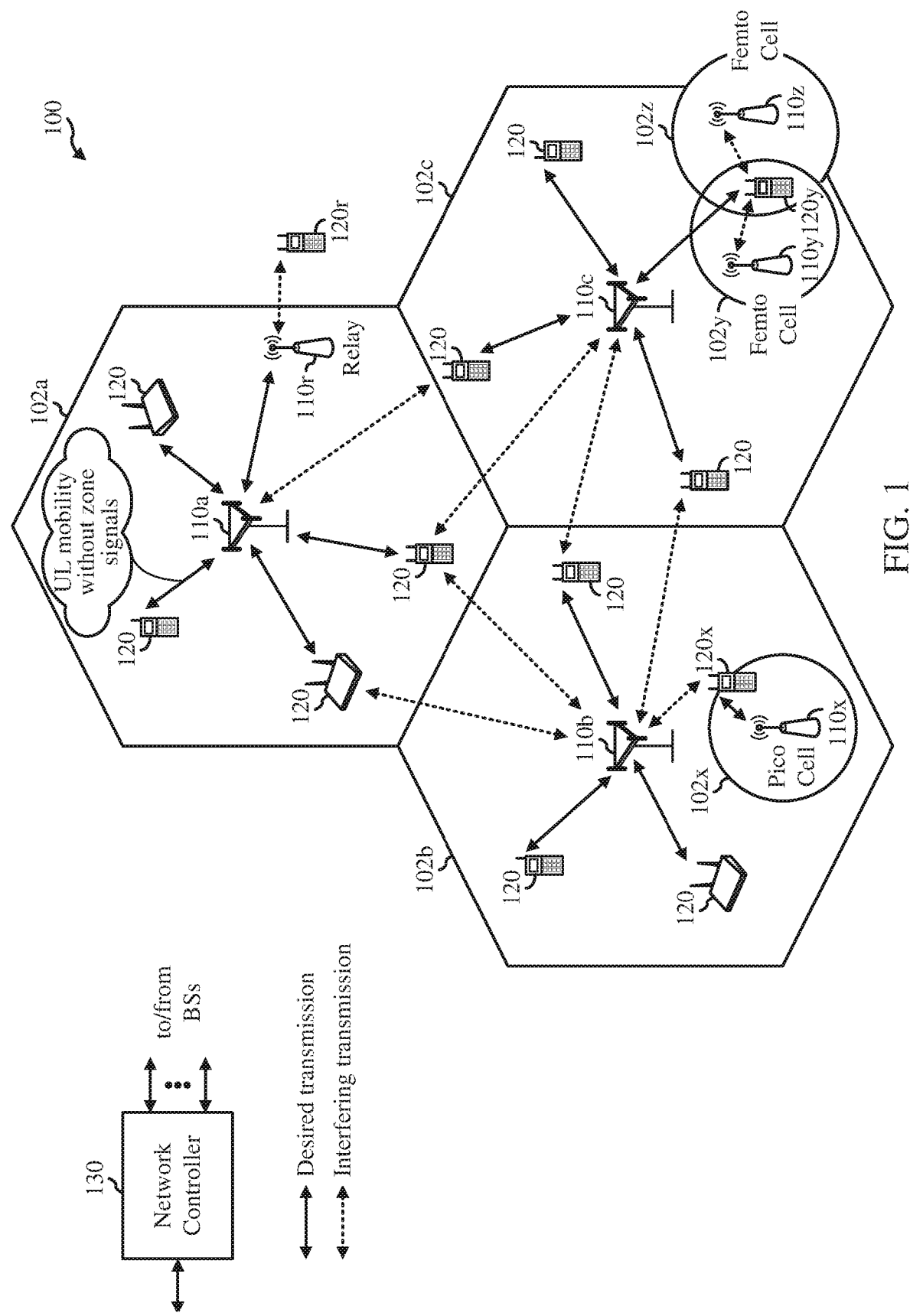
FIG. 1 is a block diagram conceptually illustrating an example telecommunications system, in accordance with certain aspects of the present disclosure.

Aspects of the present disclosure provide apparatus, methods, systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to optimizing delivery of data to and/or from a UE that is in an inactive network state.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE. CDMA. TDMA, FDMA. OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA). Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling connectivity sessions and internet protocol (IP) establishment, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a. 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE

120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may communicate with a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
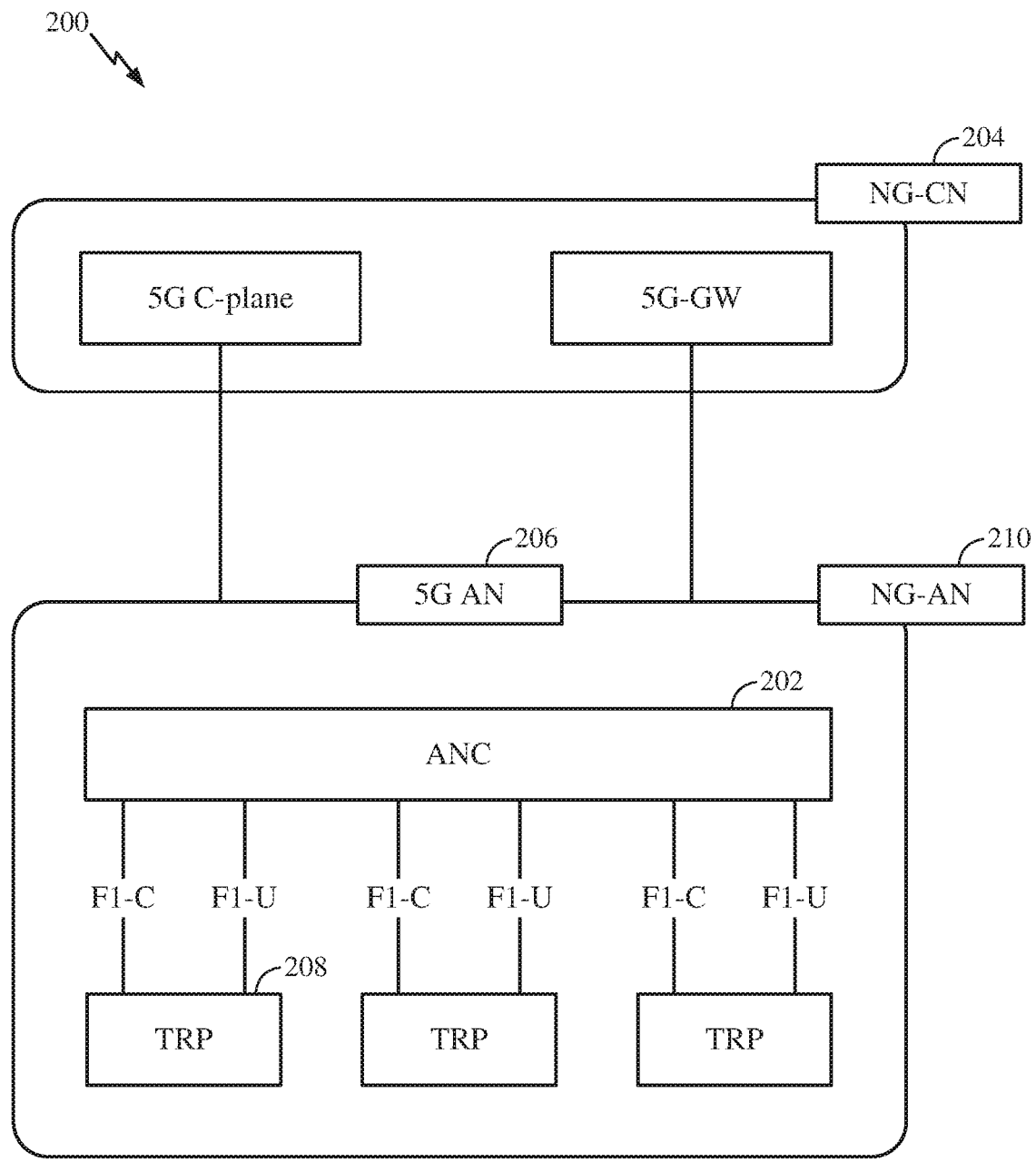
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
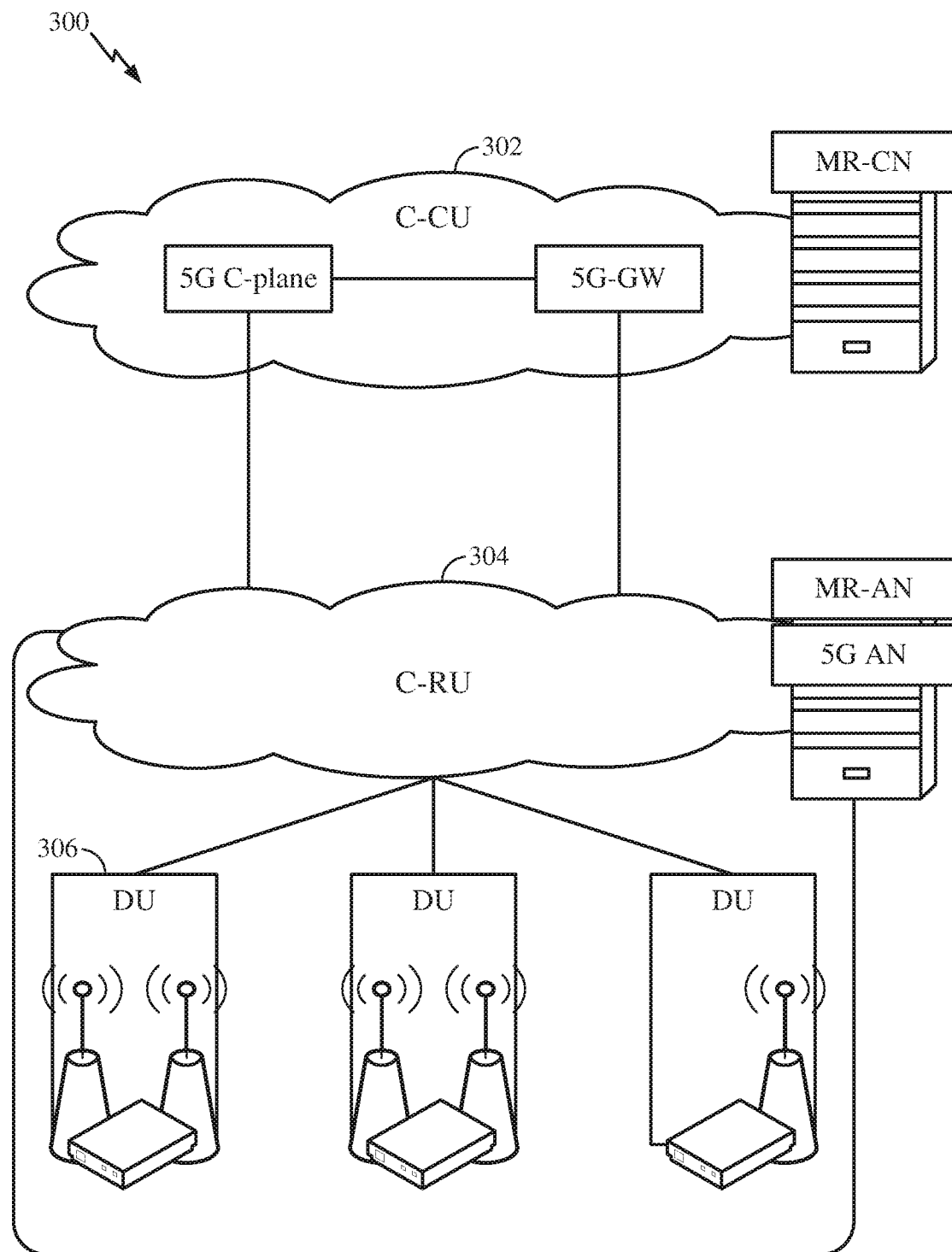
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
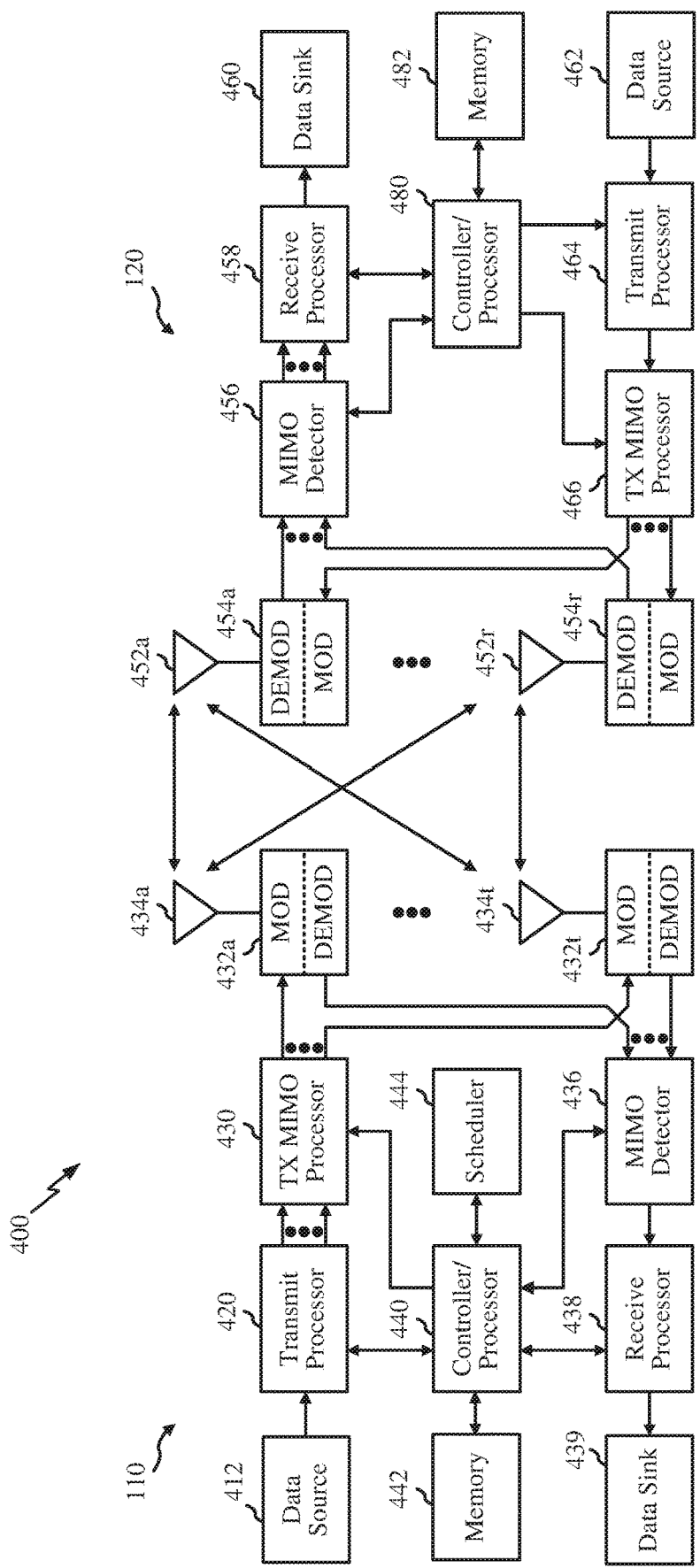
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 13.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH). Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
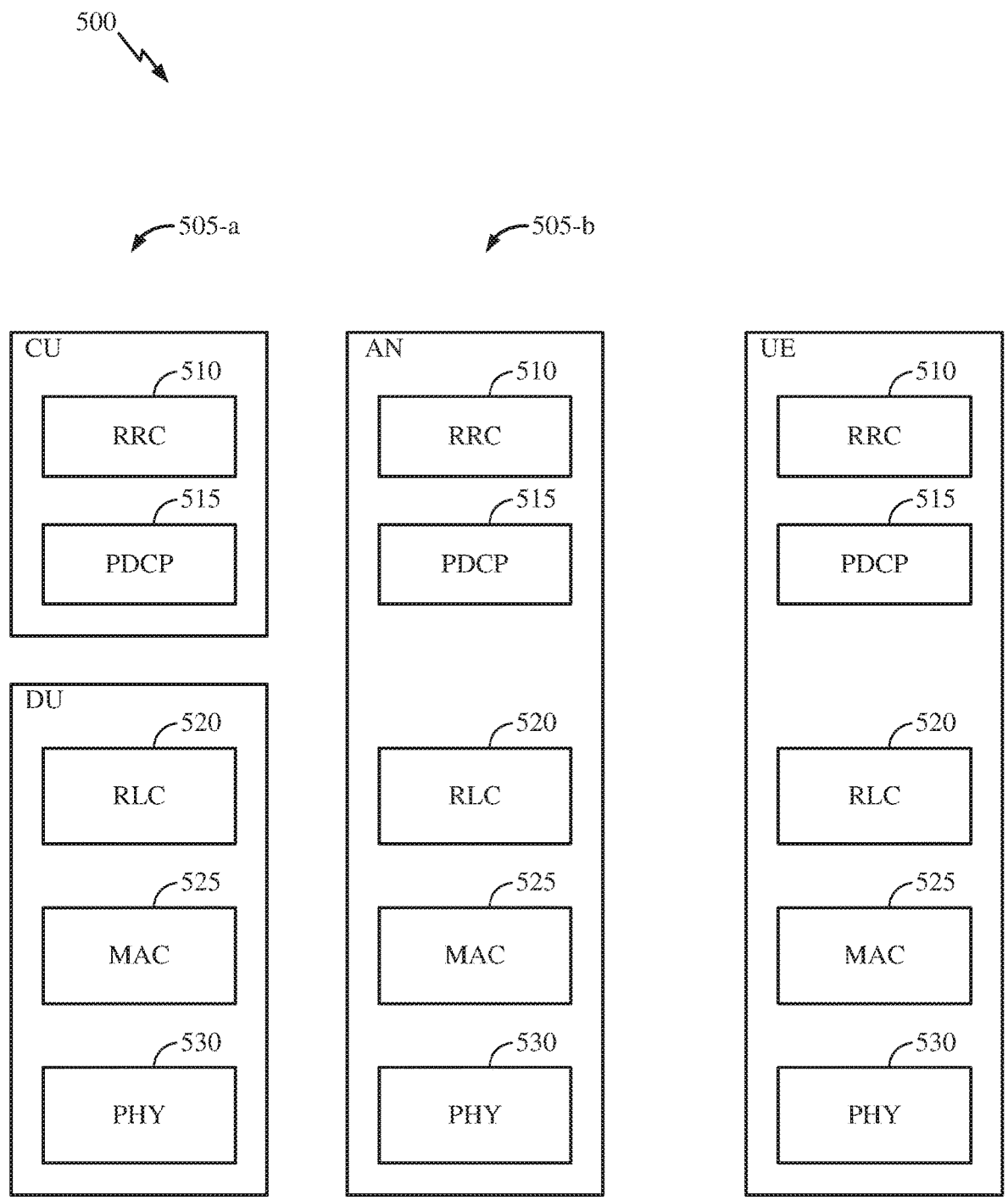
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
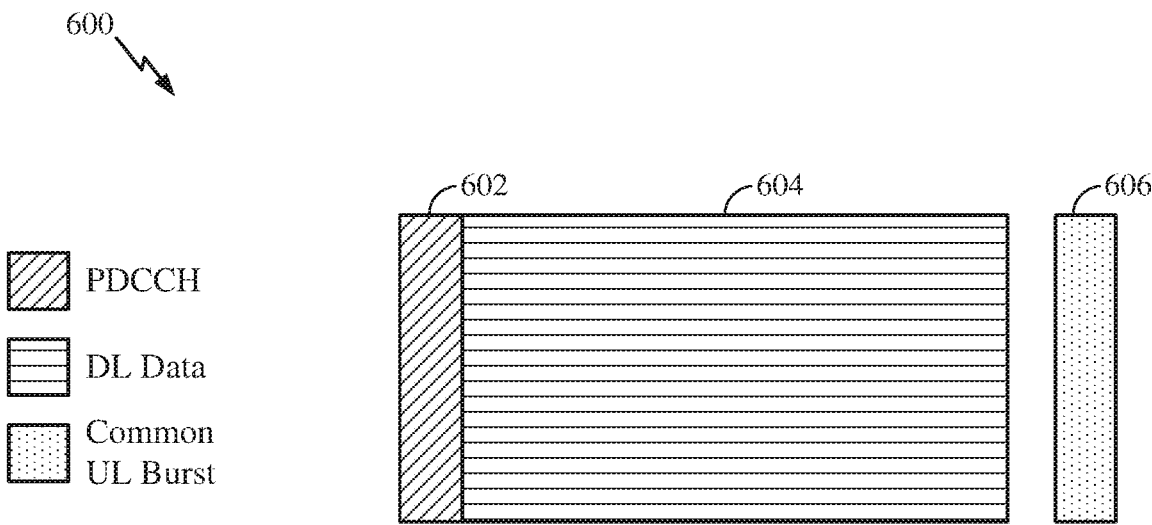
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
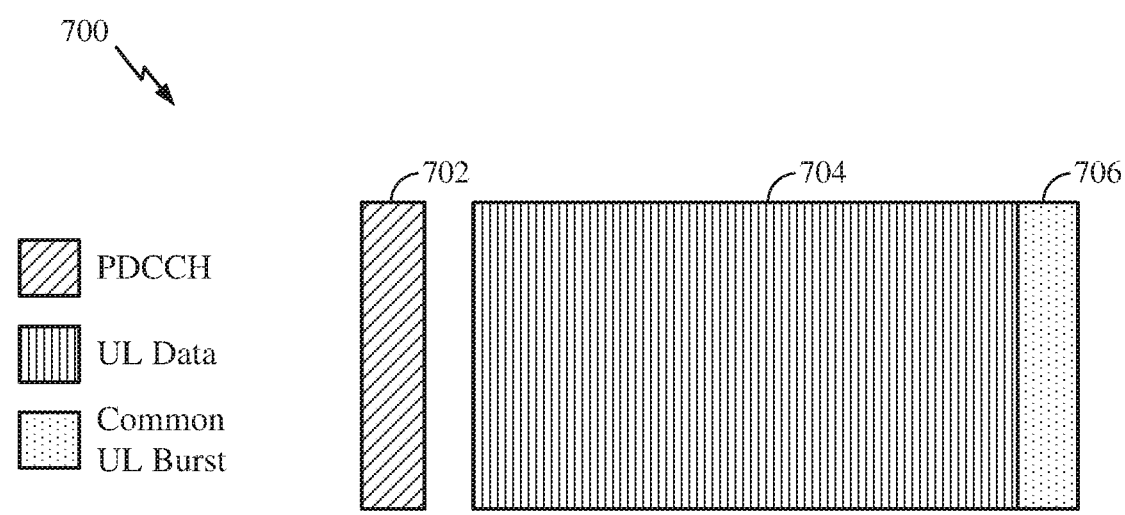
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Small Data Transmissions in a UE Inactive State

There are various IoT applications that involve an exchange of relatively small amounts of data. For example, metering and alarm applications typically involve a small amount of mobile originated (MO) data, while various queries, notifications of updates, enabling actuators, and the like involve a small amount of mobile terminated (MT) data. Unfortunately, establishing a connection between a mobile device and network involves a large overhead (relative to the small amount of data). In some cases, a UE may be placed in an inactive "RAN controlled" state that represents a middle ground between a connected state and an idle state. For example, a UE in an inactive "RAN controlled" connected state (e.g., RRC_INACTIVE state) may have various characteristics, such as:
Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to; and
The UE may have no dedicated resources.

Allowing data transmission to or from a UE (or other type of mobile device) that is in RRC_INACTIVE state makes sense if the UE has a small amount of data to transmit and RAN has no data or only a small amount of data to transmit while the UE is in the state. If either the UE or RAN has subsequent data to transmit, the overhead to move to an active connected state (e.g., RRC_CONNECTED mode) may be justified, so that the data can be sent with dedicated resources.

In one scenario, UL data transmissions may be supported without RRC signaling without initiating transition to active (this may be referred to as option A). An alternative scenario is to support UL data transmission with RRC signaling, but without initiating transition to active (this may be referred to as option B).

Aspects of the present disclosure may be applied to enable small uplink transmissions in various scenarios, such as those shown in FIG. 8. As shown, such scenarios may include a first scenario, Scenario 1, where a UE sends an uplink transmission in a same cell (as it was previously connected). In a second scenario, Scenario 2, the UE may send an uplink transmission to a different cell (than a previously connected cell) that is covered by a same PDCP entity (e.g., such that the PDCP entity does not need to be relocated). In a third scenario, Scenario 3, the UE may send an uplink transmission to a different cell in a different PDCP entity (e.g., such that the PDCP relocation may be needed).

Example Optimizations for Delivery of Data to/from a UE in an Inactive State

Aspects of the present disclosure provide for support of UL data transmissions that may be considered a change relative to the first option for small UL data delivery (option A) described above. One scenario described herein may be considered a Serving gNB based solution for small UL data transmission while a UE is an RRC_Inactive state (e.g., because the serving gNB may request a transfer of the UE context). Another scenario, which may be considered an Anchor gNB based Solution (e.g., because the anchor gNB may make the decision whether or not to transfer the UE context).

As used herein, the term anchor generally refers to a base station (e.g., an eNB/gNB) that an inactive UE has previously connected with that has the UE context for subsequent communication. On the other hand, the term serving generally refers to a base station that is currently in direct communication with a UE (and which may or may not be an anchor).

Figure 9:
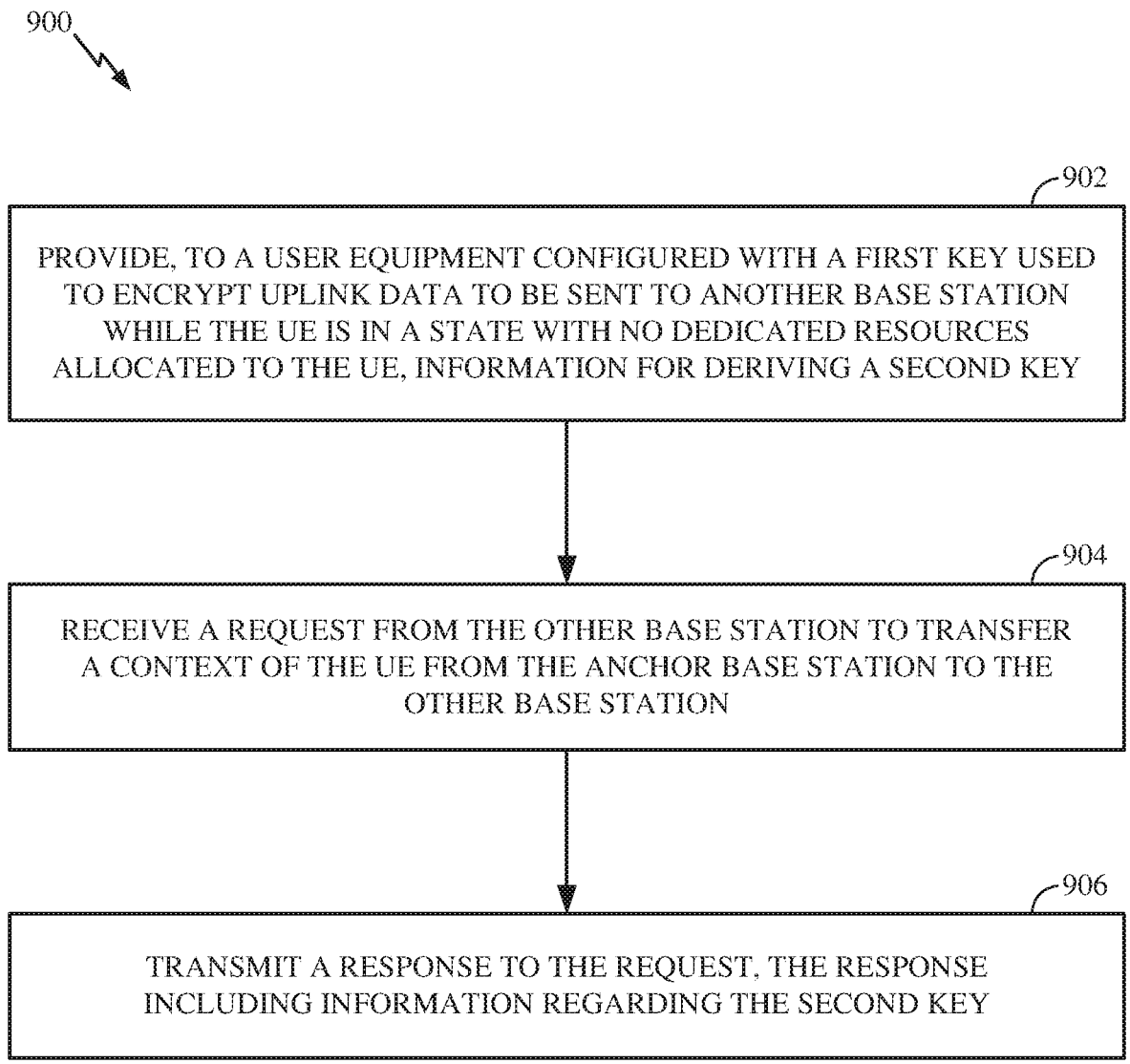
FIG. 9 illustrates example operations that may be performed by an anchor base station to enable small uplink data transmissions, in accordance with certain aspects of the present disclosure.
Figure 10:
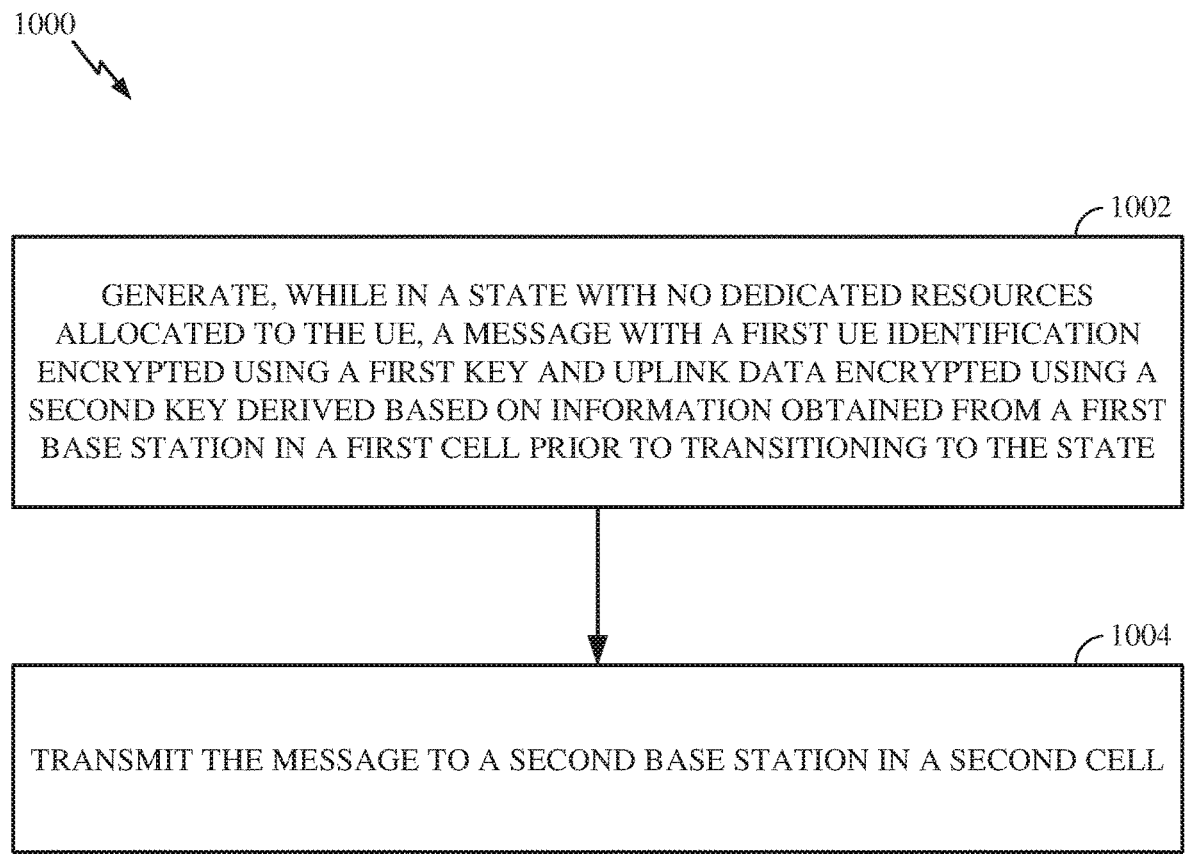
FIG. 10 illustrates example operations that may be performed by a user equipment for small uplink data transmissions, in accordance with certain aspects of the present disclosure.
Figure 11:
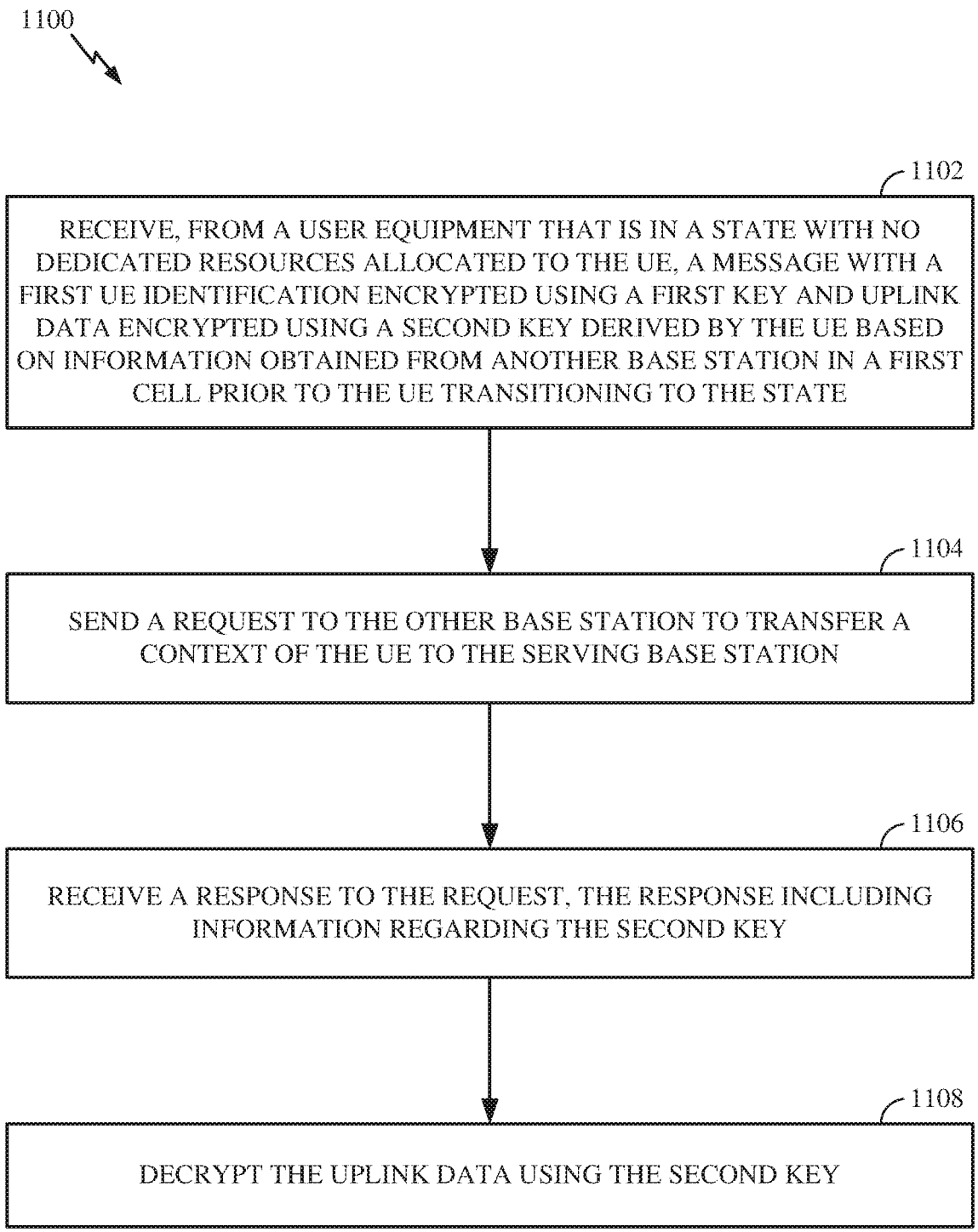
FIG. 11 illustrates example operations that may be performed by a serving base station to process small uplink data transmissions, in accordance with certain aspects of the present disclosure.

FIGS. 9-11 are flow diagrams of operations that may be performed by an anchor base station, UE, and serving base station, respectively, for what may be referred to as the serving gNB based solution for small UL data transmissions while a UE is in a state with no dedicated resources.

In other words, FIG. 9 illustrates example operations 900 that may be performed by an anchor base station to enable small uplink data transmissions, in accordance with certain aspects of the present disclosure.

Operations 900 begin, at 902, by providing, to a UE configured with a first key used to encrypt uplink data to be sent to another base station while the UE is in a state with no dedicated resources allocated to the UE, information for deriving a second key. For example, the state may be a radio resource control (RRC) state, a substate of an RRC state, or a configuration of an RRC state.

At 904, the anchor base station receives a request from the other base station to transfer a context of the UE from the anchor base station to the other base station. At 906, the anchor base station transmits a response to the request, the response including information regarding the second key.

FIG. 10 illustrates example operations 1000 that may be performed by a UE for small uplink data transmissions, in accordance with certain aspects of the present disclosure. In other words, operations 1000 may be performed by a UE configured by an anchor base station performing operations 900 described above.

Operations 1000 begin, at 1002, by generating, while in a state with no dedicated resources allocated to the UE, a message with a first UE identification encrypted using a first key and uplink data encrypted using a second key derived based on information obtained from a first base station in a first cell prior to transitioning to the state. At 1004, the UE transmits the message to a second base station in a second cell.

FIG. 11 illustrates example operations that may be performed by a serving base station to process small uplink data transmissions, in accordance with certain aspects of the present disclosure. In other words, operations 1100 may be performed by a base station serving a UE performing operations 1000 described above.

Operations 1100 begin, at 1102, by receiving, from a user equipment that is in a state with no dedicated resources allocated to the UE, a message with a first UE identification encrypted using a first key and uplink data encrypted using a second key derived by the UE based on information obtained from another base station in a first cell prior to the UE transitioning to the state. At 1104, the serving base station sends a request to the other base station to transfer a context of the UE to the serving base station. At 1106, the serving base station receives a response to the request, the response including information regarding the second key. At 1108, the serving base station decrypts the uplink data using the second key.

Figure 12:
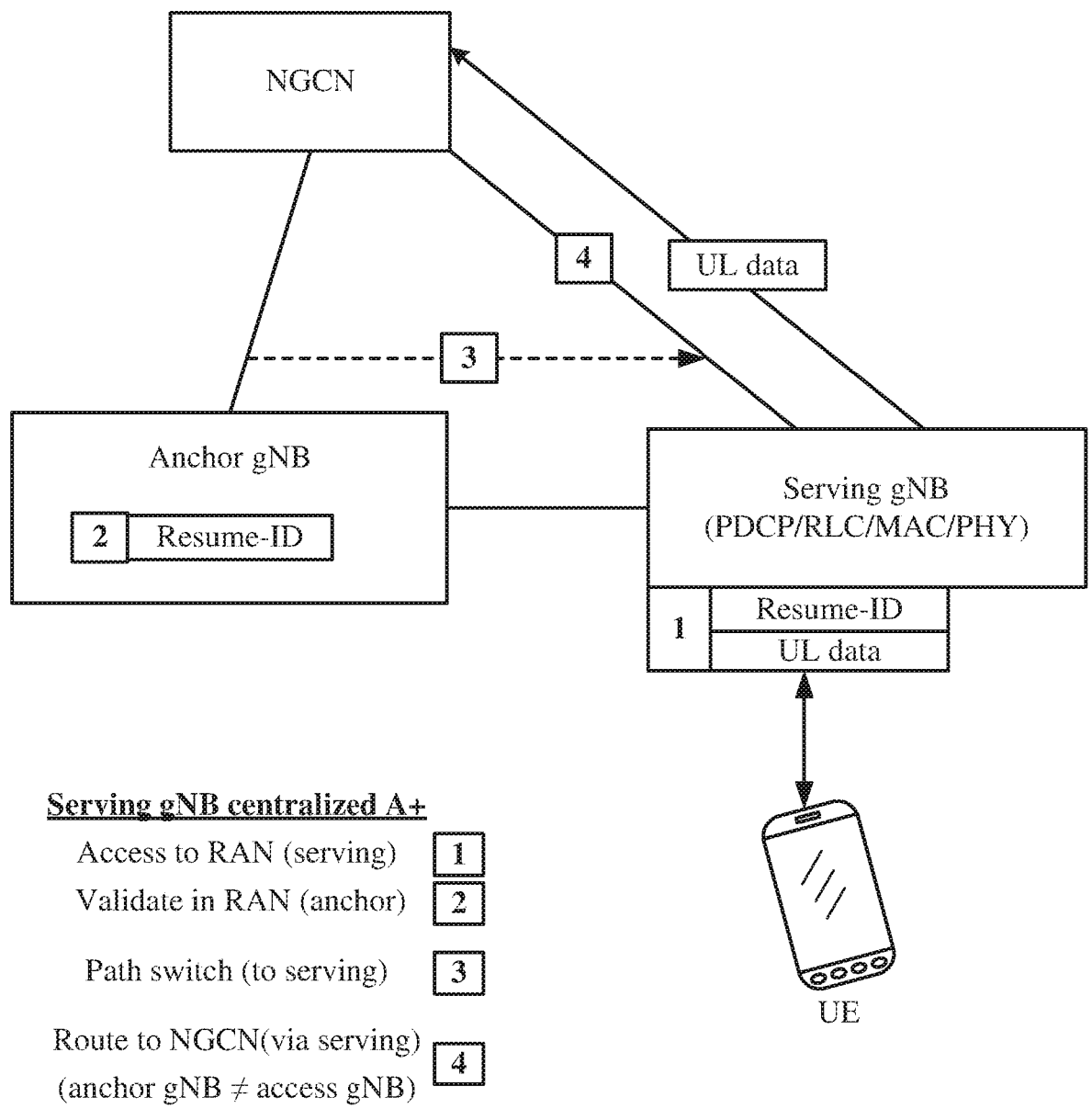
FIG. 12 illustrates example data flow for small uplink data transmissions, in accordance with certain aspects of the present disclosure.

FIG. 12 illustrates an example data flow for small uplink data transmissions, in accordance with the serving gNB based option described herein. As illustrated, a UE may access a radio access network (RAN) via a serving gNB, which may validate the UE via the anchor gNB. After validation, in some cases, a path switch may be performed (e.g., transferring context from the anchor gNB to the serving gNB). After the path switch, the UE may route UL data to the (new generation) core network (NGCN) via the serving gNB.

Figure 13:
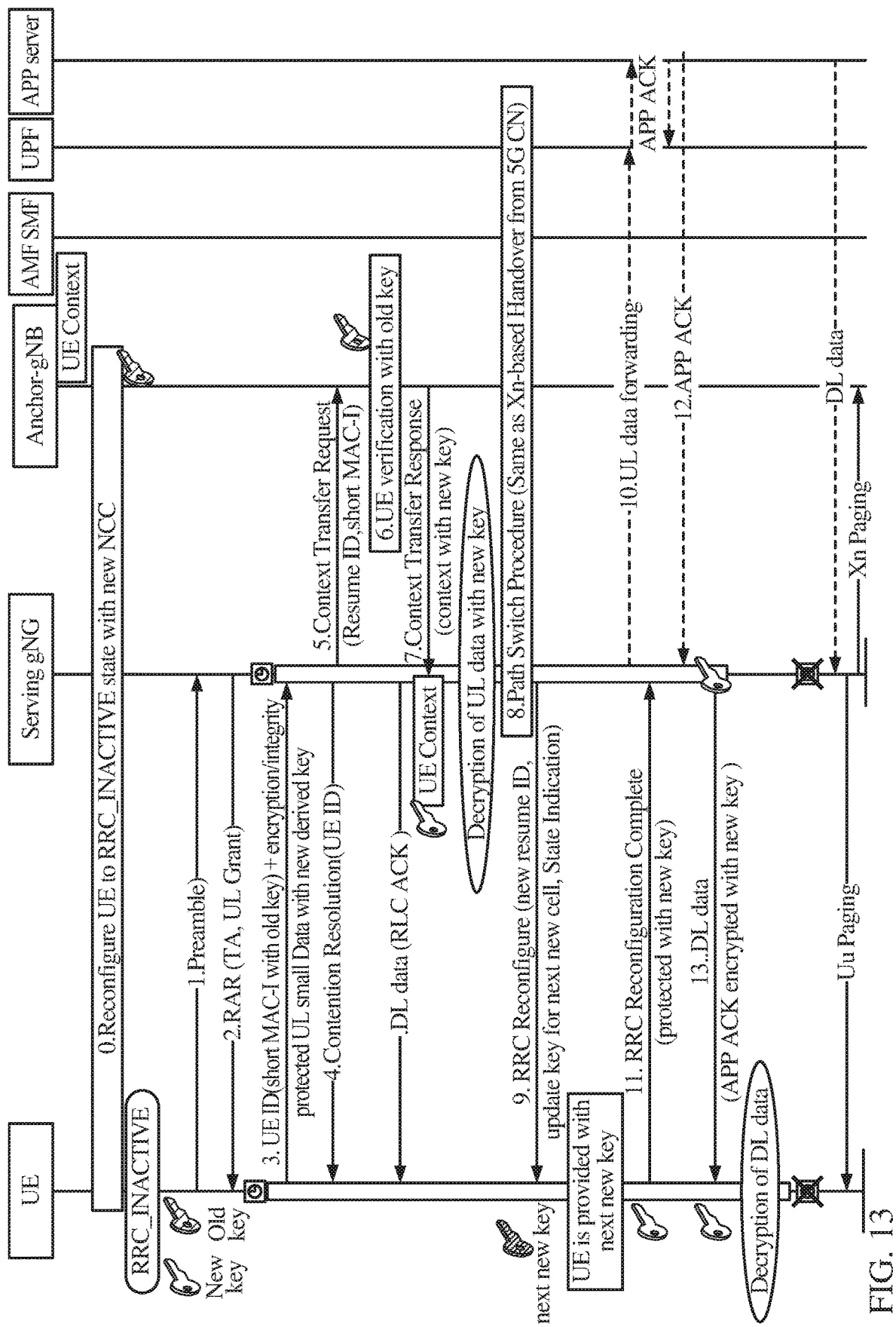
FIG. 13 illustrates an example call flow diagram for small uplink data transmissions, in accordance with certain aspects of the present disclosure.

As illustrated in the call flow diagram of FIG. 13, according to the serving gNB based solution, an Anchor gNB may provide a UE with a next hop chaining counter (NCC) for new security key derivation before transitioning the UE to enter the RRC_INACTIVE state. Thus, the UE may maintain an old key (e.g., previously derived) and the new key. Maintaining the old key after obtaining the new key may provide a mechanism for sending uplink data while the UE is in the RRC_INACTIVE state.

In Scenarios 1 and 2 (where the PDCP anchor has not changed), the UE may send uplink data together with a UE identifier (Resume ID) which is security protected with an old key in Msg3. In this case, no context transfer/path switch is needed. Downlink data sent in response to the uplink transmission may also be security protected with the old key. Thus, in this case, additional downlink signaling to reconfigure the UE with a new resume ID or new security key is NOT needed.

As illustrated in FIG. 13, the UE and serving gNB may start a timer after (the UE sends) Msg3. The UE may continuously monitor for DL transmissions during the period the timer is running.

As illustrated, after receiving UL data encrypted with the new key, the serving gNB may request a context transfer (providing the old resume ID and short MAC identifier of the UE for verification of the UE by the anchor gNB). After context is transferred (step 7), the new serving gNB may send DL RRC signaling to reconfigure the UE with, for example, a new resume ID which reflects UE new context location, a state indication, and a next new key (for encrypting uplink data).

The UE may use the next new key for security protection (if and) when it starts uplink data transmission in the next new cell. In other words, in the next new cell, the current (previously new) key will be the old key, and the current next new key will be the new key. As a result, in this approach, the UE maintains two sets of keys at the same time.

As illustrated, a Resume ID is not only allocated by gNB when it transitions the UE from RRC_CONNECTED to RRC_INACTIVE, a Resume ID is also updated/re-allocated each time after UE context is transferred from an anchor gNB to a new serving gNB.

As illustrated, in the case of Scenario 3, where a PDCP entity is relocated, the anchor gNB performs UE verification via the Resume ID (anchor gNB cell Id, UE I-RNTI in that cell), plus a short MAC-I (e.g., input is anchor gNB cell id, serving gNB cell id, UE I-RNTI in that cell), which is integrity protected with the stored old key.

As illustrated, the UL data in Msg 3 may include: a Resume ID and short MAC-I, protected with old key, plus the UL small data integrity and encryption protected with new key.

The UE and serving gNB may start a timer after transmission of Msg3. During the period this timer is running, the UE will continuously monitor for downlink transmissions, as the UE can be assumed to be reached without paging by the serving gNB. As illustrated, the serving gNB may trigger a context fetch with Resume ID and short MAC-I sent to anchor gNB, for the anchor gNB to verify the UE (e.g., the anchor gNB verifies the UE with the old key).

As illustrated, if UE verification is successful, the UE context is transferred to the (new) serving gNB from the anchor gNB. A new security key is also transferred to serving gNB. In this scenario, the path may also be switched to the new gNB, for example, in a procedure similar to an Xn handover. The serving gNB may derive a new security key, to be used to decrypt UL small data using the new key, and the serving gNB may forward the small data to the UPN.

As noted above, during the timer running period (after Msg3), the new serving gNB can send a DL App Ack (which is encrypted/integrity protected with new key) without paging.

Because of the UE context switch, the serving gNB can send downlink signaling which is security protected with the new key to reconfigures UE, for example, with a new Resume ID reflecting UE new context storage, a next new security key, and a state indication (e.g., RRC_Inactive or RRC_Connected).

In some cases, the serving gNB can also reject the UE uplink transmission, for example, by sending an RRC connection Reject message. This reject message may be security protected with the new key and may include, for example, a Wait-time, a New Resume ID (reflecting the UE new context location), and a New security key. In some cases, reconfiguring the UE with a new Resume Id and security key may be mandatory each time context is transferred.

In some cases, information may be conveyed to allow the application of overload control and traffic prioritization. For example, as the RRC_INACTIVE state is NAS aware. NAS can provide a cause value and/or call type to an application server (AS), allowing the AS to carry out unified access control (AC) based on the call type (and/or cause value) provided by NAS. In some cases, the cause value can be carried in MAC CE for network overload control and prioritization.

For Scenario 3, the network can reject a UE via RRC signaling after context is transferred from the anchor gNB to the serving gNB. In some cases, information may be conveyed to enable the network to decide if and when to move the UE to the RRC_CONNECTED state, for example, based on a data threshold, which may be left up to network implementation. Information may also be conveyed to enable a network to decide UL grant size, for example, based on a buffer status report (BSR).

Figure 14:
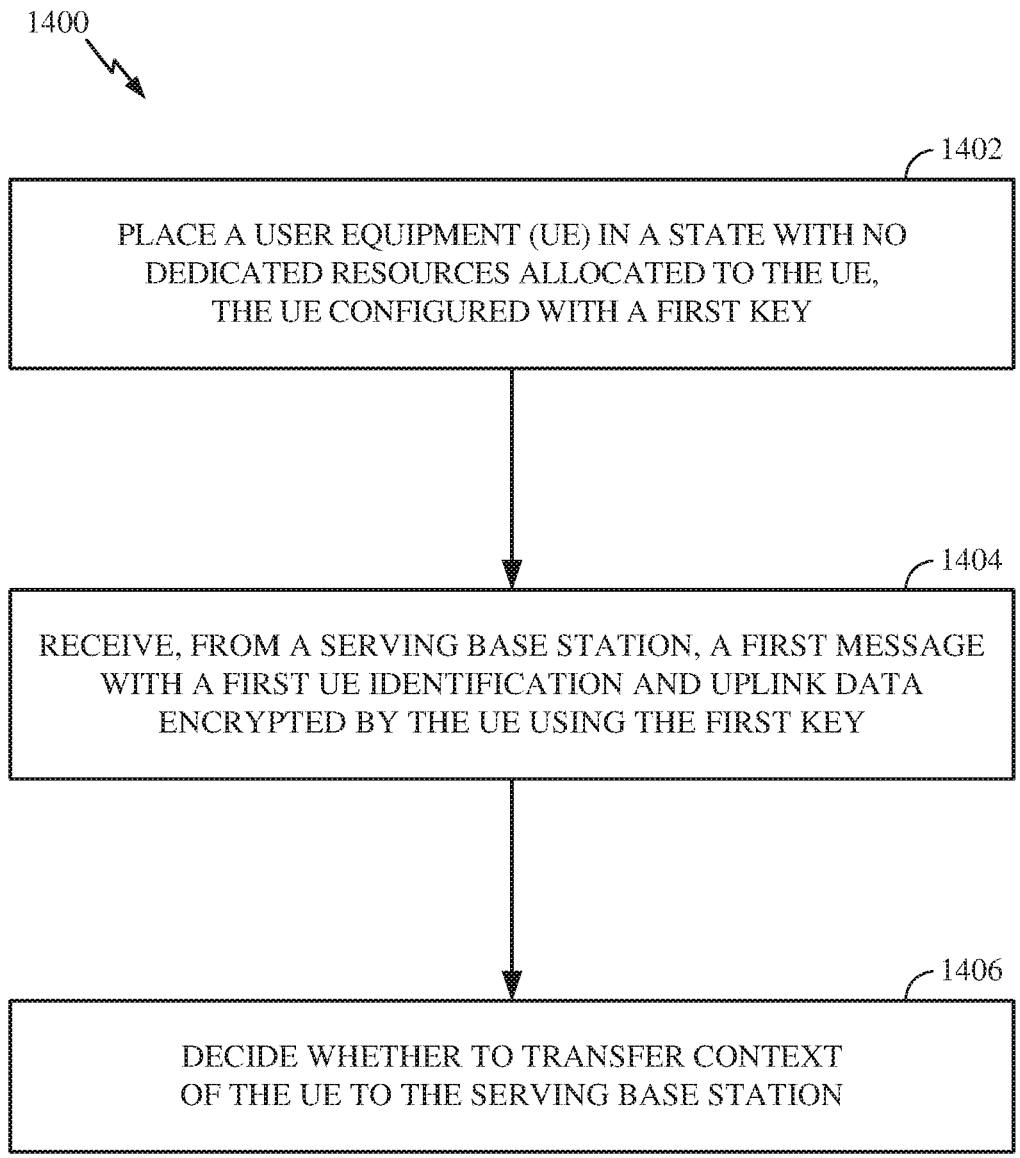
FIG. 14 illustrates example operations that may be performed by an anchor base station to enable small uplink data transmissions, in accordance with certain aspects of the present disclosure.
Figure 15:
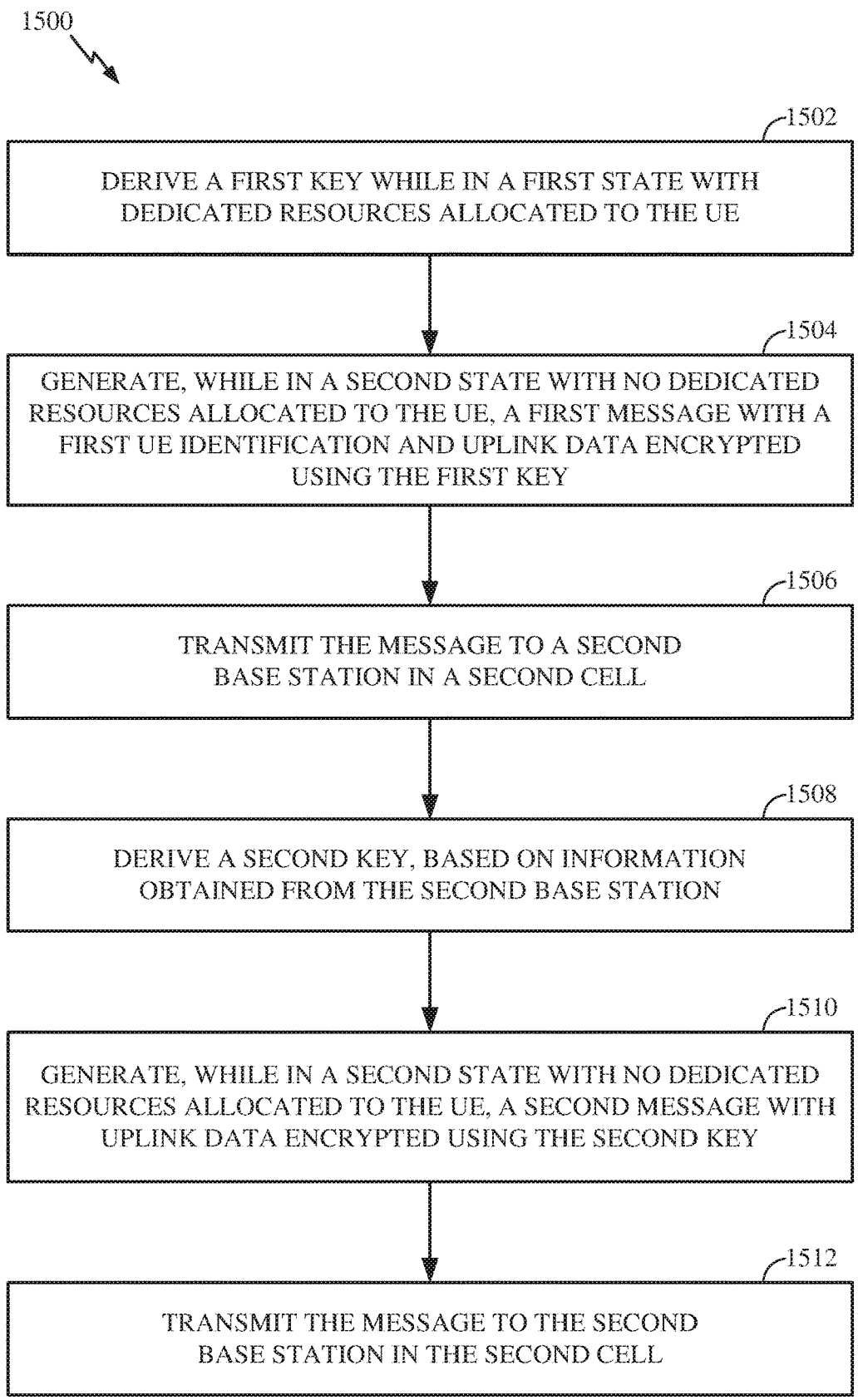
FIG. 15 illustrates example operations that may be performed by a user equipment for small uplink data transmissions, in accordance with certain aspects of the present disclosure.
Figure 16:
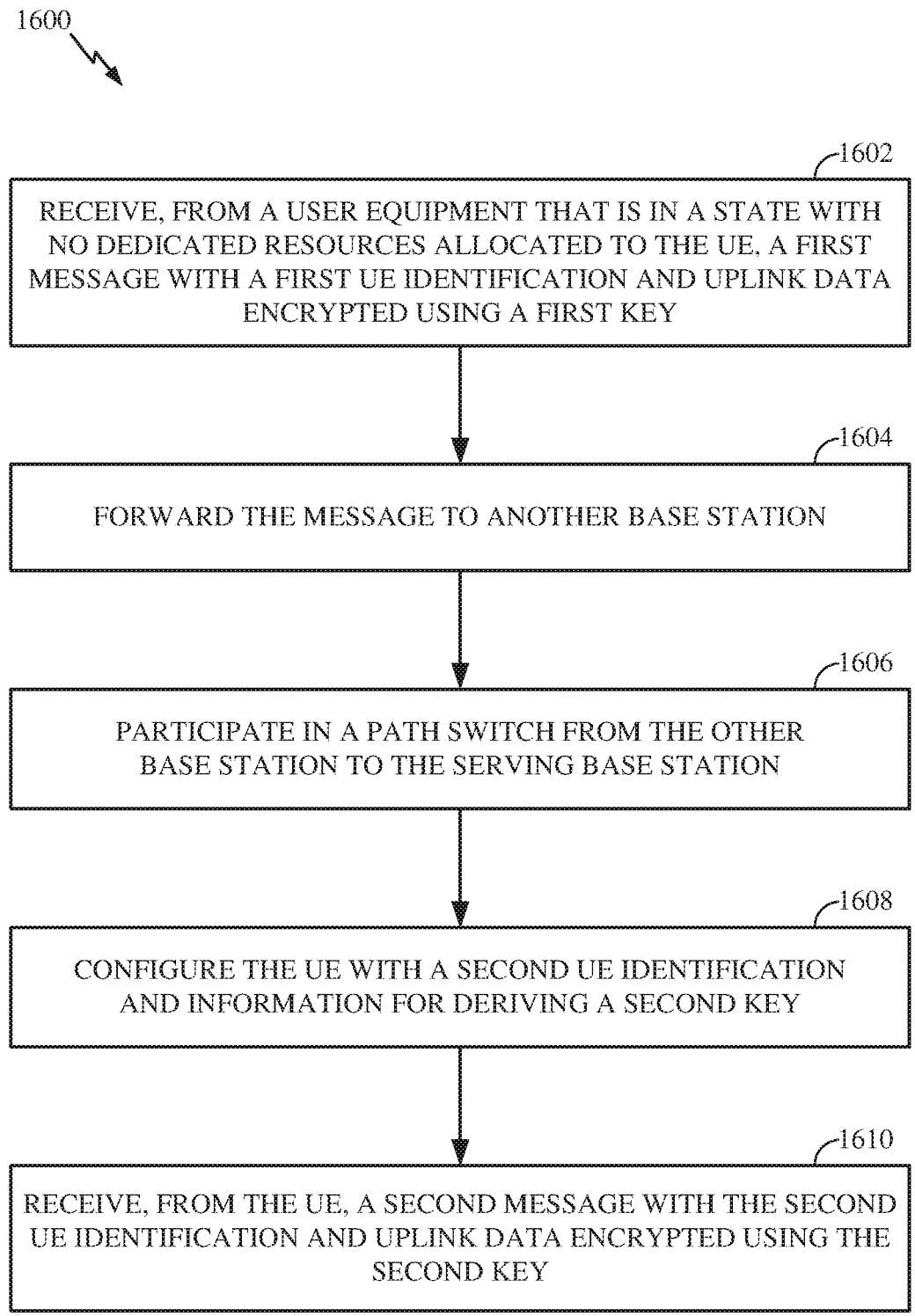
FIG. 16 illustrates example operations that may be performed by a serving base station to process small uplink data transmissions, in accordance with certain aspects of the present disclosure.

FIGS. 14-16 are flow diagrams of operations that may be performed by an anchor base station, UE, and serving base station, respectively, for what may be referred to as the anchor gNB based solution for small UL data transmissions while a UE is in a state with no dedicated resources.

FIG. 14 illustrates example operations 1400 that may be performed by an anchor base station to enable small uplink data transmissions, in accordance with certain aspects of the present disclosure.

Operations 1400 begin, at 1402, by placing a user equipment (UE) in a state with no dedicated resources allocated to the UE, the UE configured with a first key. At 1404, the anchor base station receives, from a serving base station, a first message with a first UE identification and uplink data encrypted by the UE using the first key. At 1406, the anchor base station decides whether to transfer context of the UE to the serving base station.

FIG. 15 illustrates example operations that may be performed by a user equipment for small uplink data transmissions, in accordance with certain aspects of the present disclosure. In other words, operations 1500 may be performed by a UE configured by an anchor base station performing operations 1400 described above.

Operations 1500 begin, at 1502, by deriving a first key while in a first state with dedicated resources allocated to the UE. At 1504, the UE generates, while in a second state with no dedicated resources allocated to the UE, a first message with a first UE identification and uplink data encrypted using the first key. At 1506, the UE transmits the message to a second base station in a second cell. At 1508, the UE derives a second key, based on information obtained from the second base station. At 1510, the UE generates, while in a second state with no dedicated resources allocated to the UE, a second message with uplink data encrypted using the second key. At 1512, the UE transmits the message to the second base station in the second cell.

FIG. 16 illustrates example operations that may be performed by a serving base station to process small uplink data transmissions, in accordance with certain aspects of the present disclosure. In other words, operations 1600 may be performed by a base station serving a UE performing operations 1500 described above.

Operations 1600 begin, at 1602, by receiving, from a user equipment that is in a state with no dedicated resources allocated to the UE, a first message with a first UE identification and uplink data encrypted using a first key. At 1604, the serving base station forwards the message to another base station. At 1606, the serving base station participates in a path switch from the other base station to the serving base station. At 1608, the serving base station configures the UE with a second UE identification and information for deriving a second key. At 1610, the serving base station receives, from the UE, a second message with the second UE identification and uplink data encrypted using the second key.

Figure 17:
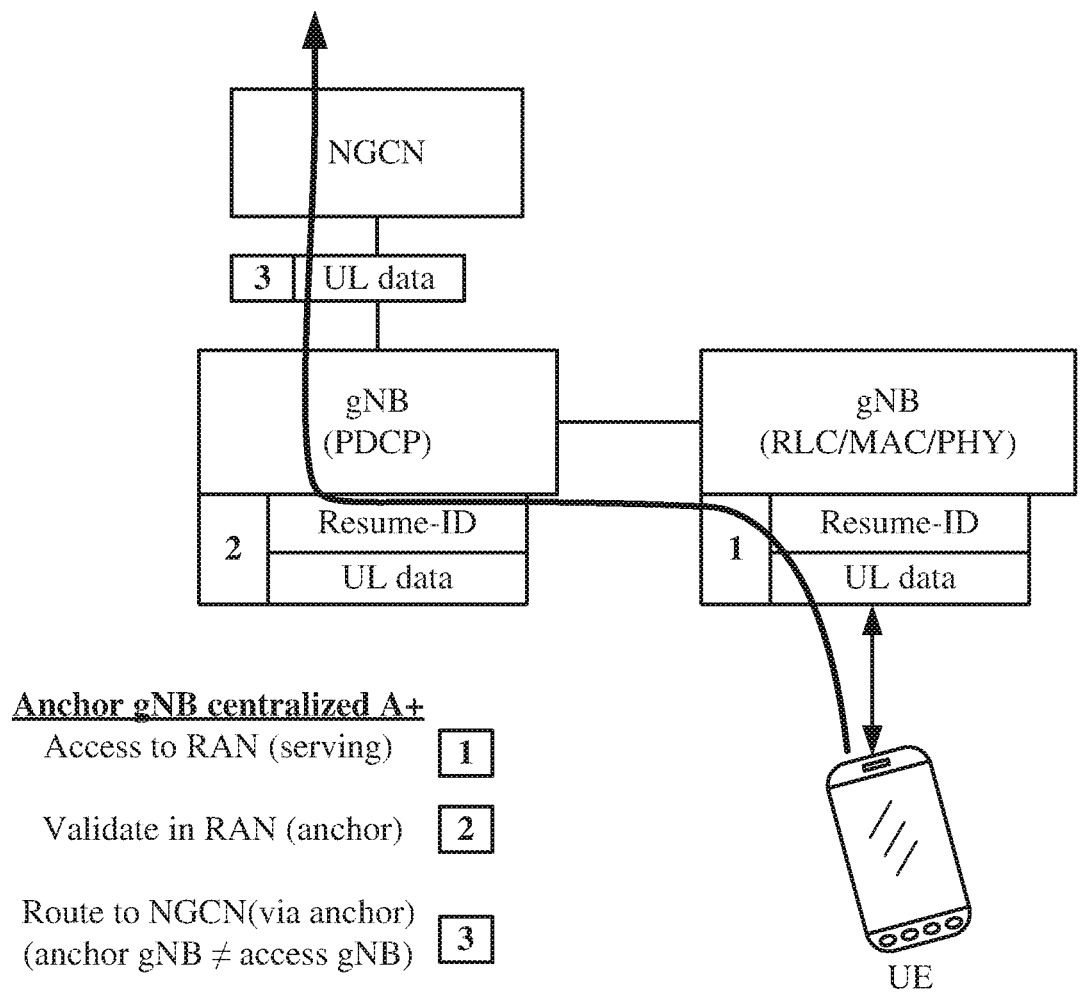
FIG. 17 illustrates example data flow for small uplink data transmissions, in accordance with certain aspects of the present disclosure.

FIG. 17 illustrates example data flow for small uplink data transmissions, in accordance with certain aspects of the present disclosure. As illustrated, a UE may access a radio access network (RAN) via a serving gNB, which may validate the UE via the anchor gNB. After validation, UE UL data may be routed to the NGCN via the anchor gNB.

Figure 18:
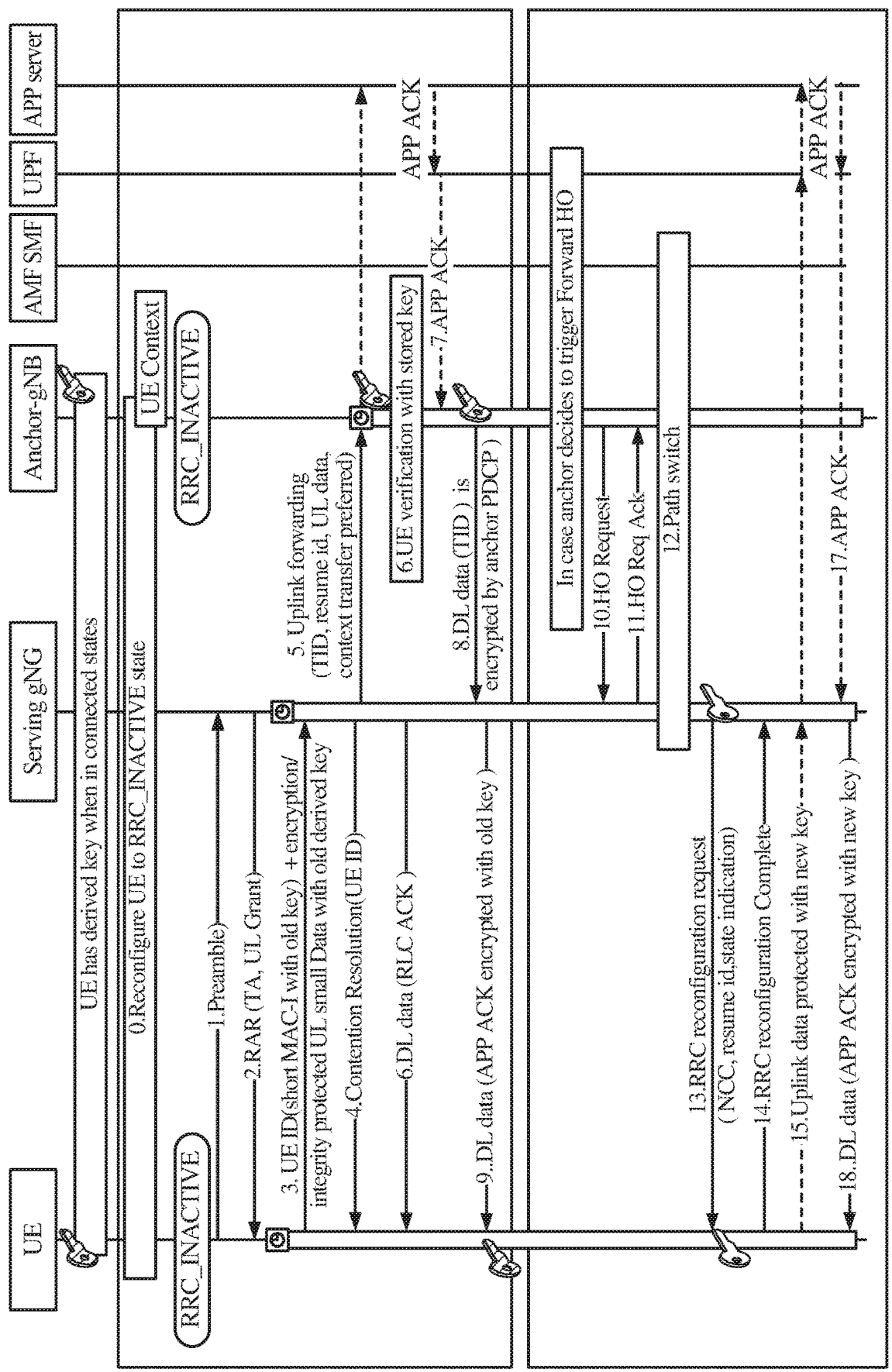
FIGS. 18 and 19 illustrate example call flow diagrams for small uplink data transmissions, in accordance with certain aspects of the present disclosure.
Figure 19:
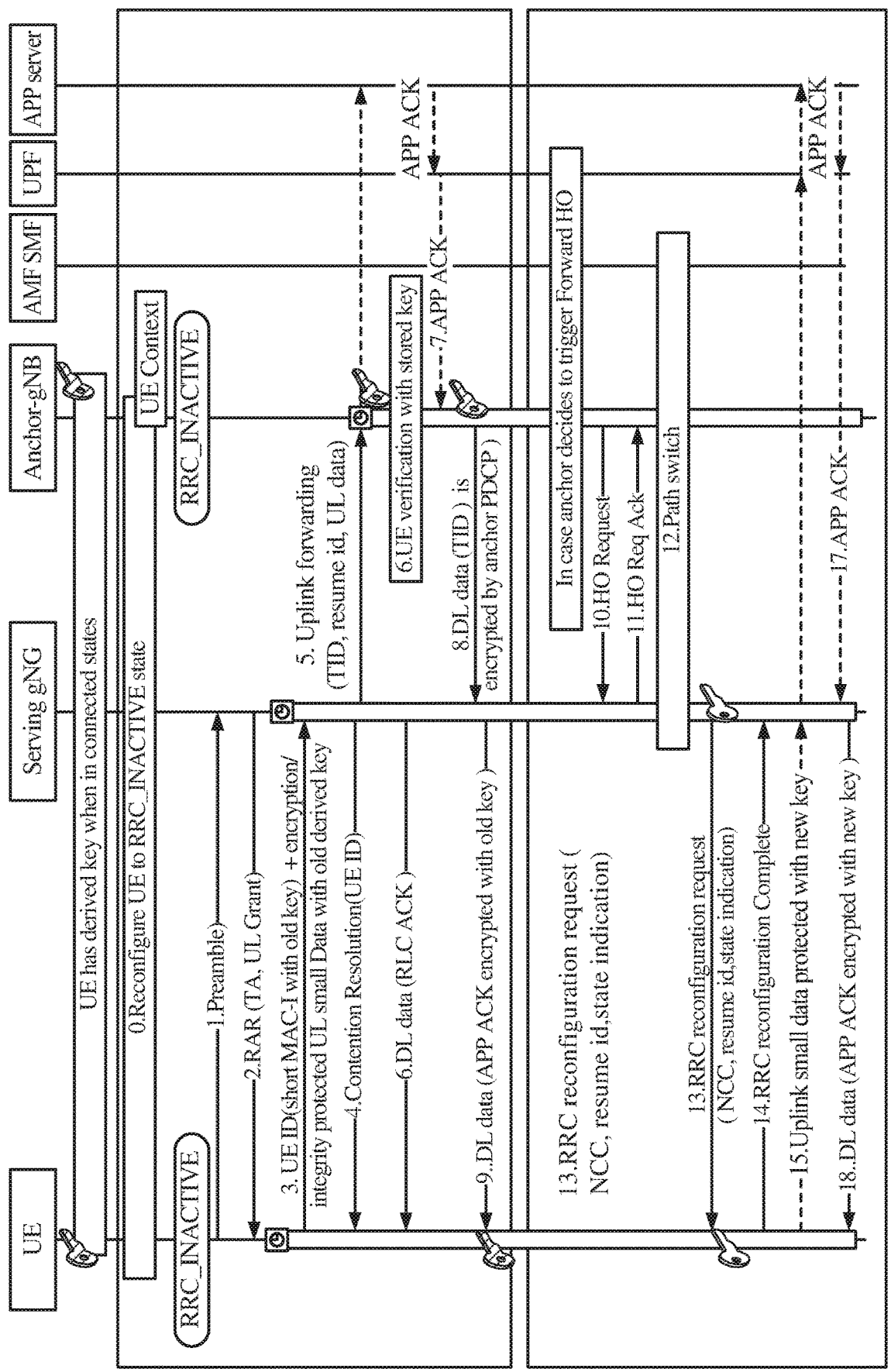

FIGS. 18 and 19 illustrate example call flow diagrams for small uplink data transmissions according to anchor gNB based solutions with and without serving gNB assistance, respectively, in accordance with certain aspects of the present disclosure.

In general, the serving gNB may operate at RLC and lower layers. As such, the serving gNB may forward UL PDCP data together with a Resume ID to the anchor gNB for UE verification and data decryption/routing to the NGCN. The anchor gNB may determine when to trigger a Forward HO to transfer context/path switch to serving gNB.

The serving gNB may reconfigure the UE with new security key and resume Id by DL RRC signaling after a path switch if the anchor gNB triggered a context transfer to the serving gNB. As such, the serving gNB becomes a new anchor gNB.

As illustrate in FIG. 18, the serving gNB may send assisted information (for example, indicating a context transfer is preferred in step 5) to let the anchor gNB decide whether and when to transfer context to serving gNB.

In steps 10-18, the anchor gNB may decide to transfer UE context to the serving gNB via a forward handover procedure or new defined procedure (involving context transfer). The trigger may be, for example, based on UE RRC States (or a substate of an RRC state) needing to be transitioned to RRC_CONNECTED states according to uplink transmission threshold, serving gNB assisted information (context transfer preferred), or the like.

Various options exist for applying overload control. For example, according to one option there may be no network based overload control or prioritization (e.g., only UE based AC is used). According to other options, air overload control and prioritization may be performed by the serving gNB. In some cases, the UE may carry a call type and/or a cause value in MAC CE (as described above for the serving gNB based solution).

In some cases, an RRC Connection Reject may occur without a path switch. In this case, the serving gNB can reject a UE uplink transmission by sending an RRC Connection reject to the UE (in some cases, a wait time may be carried in the RRC Connection Reject). In this case, there may be no path switch to the serving gNB, and the RRC Connection Reject signaling may not protected with any security In another option, an RRC Connection Reject may happen with (after) a path switch. The serving gNB may send an indication to the anchor gNB to trigger the path switch. In this case, the serving gNB (now becoming the anchor gNB) sends an RRC connection reject to the UE with integrity protection. The UE may be configured with a Resume ID and a new NCC after the path switch.

As illustrated in FIG. 19, in some cases, the serving gNB may forward UL data without assist information (e.g., without indicating preference for a context transfer).

With or without serving gNB assistance, the old key protected Resume ID and UL data may be forwarded to anchor gNB for UE verification and routing to the NGCN.

DL Data sent in response to the UL data arriving within a timer interval may be encrypted by the anchor gNB and DL forwarded to the serving gNB (the DL receiving TID is allocated by serving gNB in UL data forwarding).

In some cases, the anchor gNB may determine when and whether to forward handover (HO) to a serving gNB, a (NH, NCC) pair contained in an Xn message. In case of forwarding HO and path switch to a serving gNB, the serving gNB can reconfigure the UE with New Resume ID, new NCC, state indication, and the like. If the serving gNB determines the UE shall trigger the serving gNB based solution next time, the UE may be configured with a next NCC.

After RRC reconfiguration is complete, UL data may be verified and routed to the NGCN via the serving gNB (which is now an anchor gNB).

Figure 20:
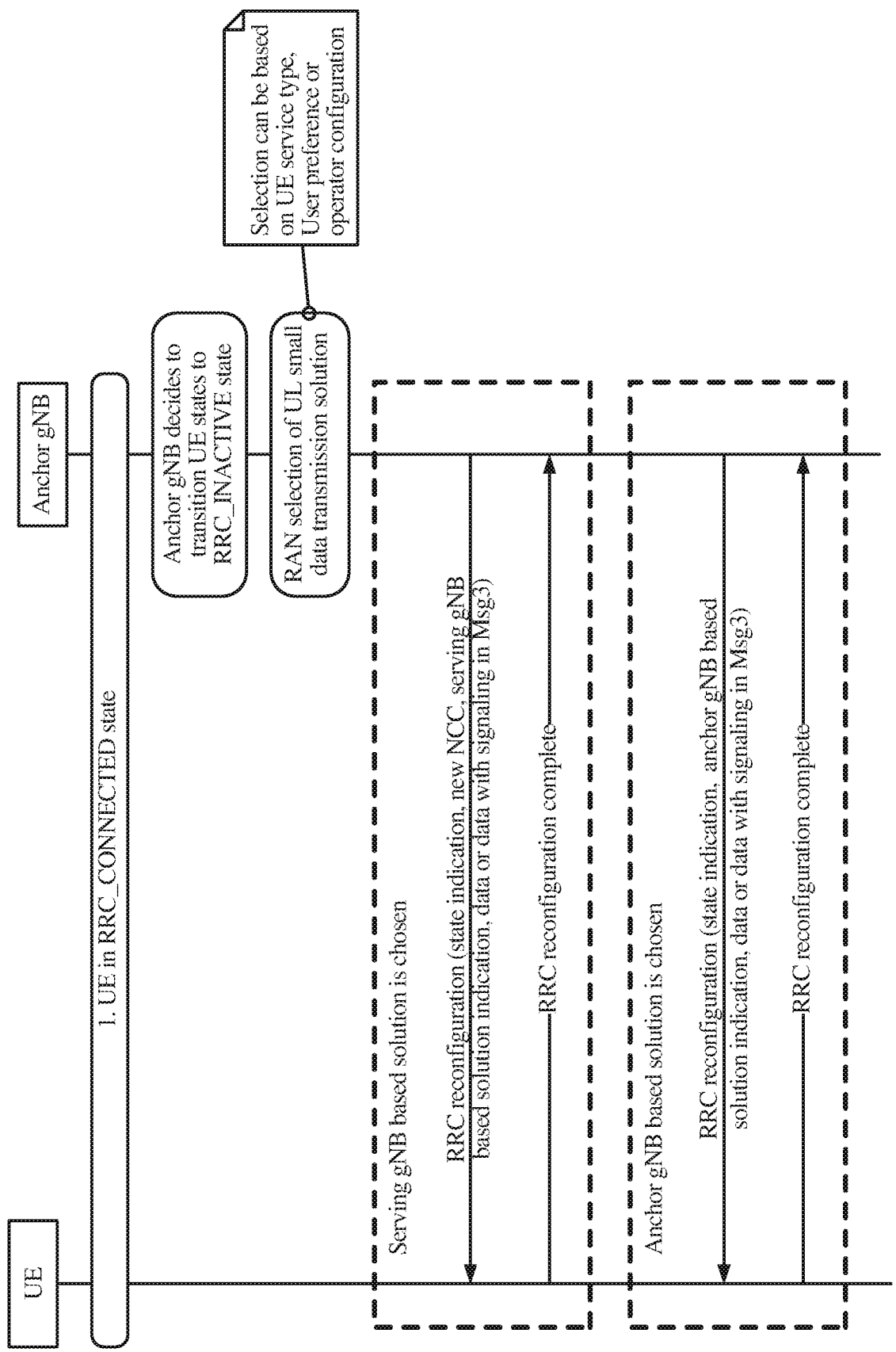
FIG. 20 illustrates how an anchor base station may select a solution for small uplink data transmissions, in accordance with certain aspects of the present disclosure.

As illustrated in FIG. 20, in some cases, an anchor base station may select which solution (e.g., the anchor gNB-based or the serving gNB-based) is used for small uplink data transmissions, in accordance with certain aspects of the present disclosure. In some cases, the selection may take place when an anchor gNB decides to transition a UE to an RRC_INACTIVE state. As illustrated, the selection may be based on various factors, such as a UE service type, user preference, or operator configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
generating, while in a state with no dedicated resources allocated to the UE, a message with a first UE identification security protected using a first key and uplink data encrypted using a second key derived based on information obtained from a first cell prior to transitioning to the state;
transmitting the message to a second cell; and
receiving, from the second cell, a message indicating a second UE identification and information regarding a third key to use for encrypting uplink data sent in a third cell.

2. The method of claim 1, wherein the state comprises at least one of: a radio resource control (RRC) state, a substate of an RRC state, or a configuration of an RRC state.

3. The method of claim 1, further comprising:
generating a reconfiguration complete message encrypted using the second key; and
transmitting the reconfiguration complete message to the second base station.

4. The method of claim 3, further comprising:
receiving a message from the second base station with downlink data; and
decrypting the downlink data using the second key.

5. The method of claim 1, further comprising:
generating a message with uplink data encrypted using the third key; and
transmitting the message to a third base station in the third cell while the UE is in a state in the third cell with no dedicated resources allocated to the UE.

6. The method of claim 1, further comprising receiving signaling, from the first cell, placing the UE in the state with no dedicated resources and indicating a configuration for sending uplink data while the UE is in the state.

7. The method of claim 1, further comprising providing an indication of at least one of a call type or a cause type to allow for network access control of the uplink data.

8. A method for wireless communications by a serving base station, comprising:
receiving, from a user equipment that is in a state with no dedicated resources allocated to the UE, a message with a first UE identification security protected using a first key and uplink data encrypted using a second key derived by the UE based on information obtained from a first cell prior to the UE transitioning to the state;
sending a request to the other base station to transfer a context of the UE to the serving base station;
receiving a response to the request, the response including information regarding the second key;
decrypting the uplink data using the second key; and
transmitting, to the UE, a reconfiguration message indicating a second UE identification and information regarding a third key for the UE to use for encrypting uplink data sent in a third cell.

9. The method of claim 8, wherein the state comprises at least one of: a radio resource control (RRC) state, a substate of an RRC state, or a configuration of an RRC state.

10. The method of claim 8, further comprising:
receiving, from the UE, a reconfiguration complete message encrypted using the second key.

11. The method of claim 10, further comprising:
transmitting, to the UE, a message with downlink data encrypted using the second key.

12. The method of claim 8, further comprising obtaining an indication of at least one of a call type or a cause type to allow for network access control of the uplink data.

13. The method of claim 12, further comprising providing the indication to an application server.

14. The method of claim 13, further comprising providing, based on the indication, radio resource control (RRC) signaling for a connection reject after the a context transfer of the UE to the serving base station.

15. A method for wireless communications by an anchor base station, comprising:
providing, to a user equipment configured with a first key used to encrypt uplink data to be sent to another base station while the UE is in a state with no dedicated resources allocated to the UE, information for deriving a second key;
receiving a request from the other base station to transfer a context of the UE from the anchor base station to the other base station, wherein the request indicates a first UE ID and the anchor base station verifies the UE based on the first UE ID and using the first key; and
transmitting a response to the request, the response including information regarding the second key.

16. The method of claim 15, wherein the state comprises at least one of: a radio resource control (RRC) state, a substate of an RRC state, or a configuration of an RRC state.

17. The method of claim 15, wherein the information for deriving the second key is provided to the UE when reconfiguring the UE to the state.

18. The method of claim 15, further comprising signaling the UE to enter the state with no dedicated resources and indicating a mechanism for sending uplink data while the UE is in the state.

19. The method of claim 18, further comprising selecting the mechanism based on at least one of a service type of the UE, a user preference, or network operator configuration.

20. A method for wireless communications by an anchor base station, comprising:
placing a user equipment (UE) in a state with no dedicated resources allocated to the UE, the UE configured with a first key;
receiving, from a serving base station, a first message with a first UE identification and uplink data encrypted by the UE using the first key;
verifying the UE using the first key;
receiving, from the serving base station, a preference for a context transfer from the other base station to the serving base station; and
deciding whether to transfer context of the UE to the serving base station.

21. The method of claim 20, further comprising:
sending a message to the other base station with downlink data encrypted using the first key to be forward to the UE.

22. The method of claim 20, wherein the state comprises at least one of: a radio resource control (RRC) state, a substate of an RRC state, or a configuration of an RRC state.

23. The method of claim 20, further comprising signaling the UE to enter the state with no dedicated resources and indicating a mechanism for sending uplink data while the UE is in the state.

24. The method of claim 23, further comprising selecting the mechanism based on at least one of a service type of the UE, a user preference, or network operator configuration.

25. The method of claim 20, further comprising obtaining an indication of at least one of a call type or a cause type to allow for network access control of the uplink data.

26. The method of claim 25, further comprising providing the indication to an application server.

27. The method of claim 1, wherein the security protection comprises an integrity protection.

28. The method of claim 1, wherein the state with no dedicated resources allocated to the UE comprises an RRC_INACTIVE state.

* * * * *